United States Patent [19]

Randles

[11] Patent Number: 4,881,929

[45] Date of Patent: Nov. 21, 1989

[54] STOP AND GO CONVEYOR

[76] Inventor: Arthur E. Randles, 4617 S. Third Ave., Tucson, Ariz. 85714

[21] Appl. No.: 352,156

[22] Filed: May 15, 1989

[51] Int. Cl.⁴ ............................................. F16H 7/08
[52] U.S. Cl. ...................................... 474/111; 198/813
[58] Field of Search ............... 474/101, 109, 111, 113, 474/114, 115, 117, 112, 133, 135, 136, 138; 198/813, 814, 815

[56] References Cited

U.S. PATENT DOCUMENTS

| | | | |
|---|---|---|---|
| 2,170,888 | 8/1939 | Abel | 474/136 X |
| 2,426,960 | 9/1947 | Wesselhoff | 474/112 |
| 3,054,499 | 9/1962 | Detix et al. | 198/815 |
| 3,115,046 | 12/1963 | Bliss et al. | 474/111 |
| 3,830,114 | 8/1974 | Daines | 474/111 |

Primary Examiner—Thuy M. Bui
Attorney, Agent, or Firm—Stidham, Melvin R.

[57] ABSTRACT

The stop and go conveyor includes a driver sprocket and a driven sprocket from which the conveyor is directly driven. On both the tension or drive side of the chain and the slack side of the chain are a pair of fixed idler sprockets and between them is a pair of idler sprockets mounted on a idler sprocket carrier which reciprocates through a complete cycle during each revolution of the driver sprocket. During the stop period of the driver sprocket, chain is being taken up by the driver sprocket by action of the reciprocating member which supplied extra chain. During the second half of the stroke, the reciprocating member uses extra chain, whereby the driven sprocket rotates faster than the driver sprocket. In adition, the reciprocating member moves in such a fashion that, when the driven sprocket starts to rotate it accelerates slowly to a peak angular velocity and the decellerates back down to zero. Its velocity vs. time is represented by a sine curve, an ideal situation for material handling.

5 Claims, 1 Drawing Sheet

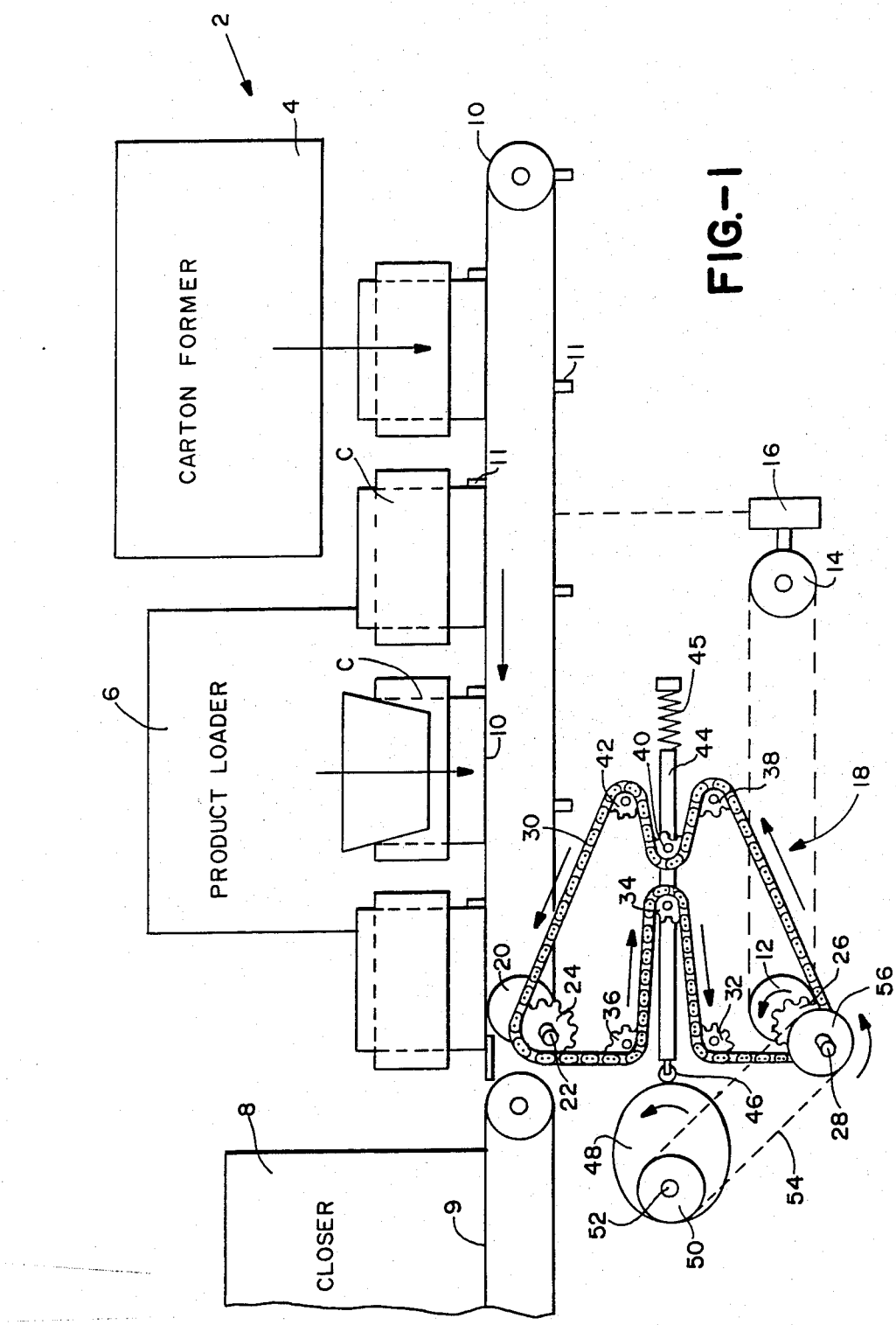

STOP AND GO CONVEYOR

BACKGROUND OF THE INVENTION

Certain conveyors carrying articles being worked on are preferably stopped at regular intervals to facilitate the performance of work at a particular work station. For example, in certain container filling machines wherein an open container is delivered by conveyor to a a load location and is to be filled with a specific amount of the product to be packaged, the covneyor is preferably stopped so that the cotainer can be filled without spillage or loss. Conventional stop and go conveyors generally include complex and expensive brakes, clutches, limit switches and the like, which increase the cost of manufacture, as well as the problems of maintenance.

OBJECTS OF THE INVENTION

It is an object of this invention to provide a stop and go conveyor with very simple mechanical means for stopping the conveyor at regular intervals for prescribed rest durations.

It is a further object of this invention to provide a stop and go conveyor which may be advanced a given incnrement of movement durig neach revolution of a constant speed input shaft, although there is a period during which the conveyor remains stationary.

Other objects and advantages of this invention will become apparent from the description to follow, particularly when read in conjunction with the accompaying drawing.

SUMMARY OF THE INVENTION

In carrying out this invention, I provide a constant speed driver sprocket to pull a chain driving a driven sprocket, which is directly connected to drive the conveyor. Idler sprockets, which are provided to take up slack between the driver and driven pulleys, are mounted on an idler sprocket carrier that is reciprocated transversely of the runs between sprockets. The idler sprocket carrier is reciprocated by a rotating cam, usually at the same speed as the driver sprocket, although it may be other than 1:1. In a stroke of the idler sprocket carrier during conveyor movement, the reciprocating idler sprocket takes excess chain from the driven sprocket while taking less chain from the driver sprocket and, during a conveyor stop period, more chain is taken from the driver sprocket than is taken from the driven sprocket. During the conveyor stop period, the excess chain is supplied by the idler sprocket as fast as it is pulled by the driver sprocket so that the driven sprocket, and hence the conveyor, are not moved. During the return stroke the driven sprocket is driven faster than normal in order to catch up. The velocity of the driven sprocket as a function of time is a sine curve of variable amplitude. It should be noted that, as a possible additional feature of this system, the conveyor may be made to back up a short distance by modifying the profile of the cam that drives the reciprocating idler sprocket carrier, or merely by changing the ratio of the rate of rotation of the cam to that of the driver sprocket.

BRIEF DESCRIPTION OF THE DRAWING

In the drawing:

FIG. 1 is a schematic view of the stop and go conveyor of this invention.

DESCRIPTION OF A PREFERRED EMBODIMENT

Referring now to the drawing with greater particularly, in the system of this invention 2, a carton former station 4 is adapted to erect a carton C from a blank (not shown) and send it to a product loader station 6. From there it goes to a carton closing apparatus 8 on a separate conveyor 9. Cartons C are delivered, in sequence to the product loader station 6 by means of a flighted conveyor 10 having lugs 11 spaced at regular intervals along the chain 10 to push the cartons C along. As will be described, the conveyor 10 is desirably conditioned to stop for a period at the product loader station 6 to facilitate filling without spilling.

The input sprocket 12 of the stop and go conveyor drive 18 is driven at a constant rotary speed from a take-off sprocket 14, which in turn, may be driven by a right angle drive 16 taken from the carton former 4. As will be seen, the input sprocket 12 drives all other sprockets.

The conveyor chain 10 is driven directly by a sprocket 20, which may be of the same size and keyed to the same shaft 22 as a stop and go output or driven sprocket 24. The pitch circumference of the conveyor sprocket 20 should be equal to the distance between lug centers. The driven sprocket 24 is in turn driven by a constant speed main driver sprocket 26, which is of the same size as sprockets 12 and 24. The main driver sprocket 26 is keyed to the same shaft 28 as input sprocket 12 so as to rotate at the same constant speed.

The main driver sprocket 26 pulls the chain 30 to drive the conveyor stop and go driven sprocket 24 through idler sprockets 32, 34 and 36 on the tension side. On the slack side from the driver sprocket 26, slack is taken up through idler sprockets 38, 40 and 42. Idler sprockets 32 and 36 on the drive side, as well as idler sprockets 38 and 42 on the slack side, are mounted on fixed shafts, while sprocket 34 on the drive side and sprocket 40 on the return or slack side are mounted on a horizontal reciprocating bar 44, which is biased to the left by any suitable means such as a spring 45 or a box cam. The reciprocating bar 44 carries a cam follower 46, which rides on the surface of a rotary cam 48 to be reciprocated thereby. The cam 48 rotates with sprocket 50 which is keyed to the same shaft 52. The sprocket 50 is driven by chain 54 from sprocket 56 on the shaft 28 with main drive sprocket 26.

The driver and driven sprockets 26 and 24, as well as the cam driving sprockets 56 and 50 may be of the same pitch circumference so that they all complete a revolution in the same time, with the driver sprocket 26 and the cam drive sprockets 56 and 50 rotating at the same constant speed. However, the sprocket ratios may be changed in order to accommodate different lug centers; to provide for conveyor back up; to increase or decrease duration of stop periods; and the like. The pitch circumference of the sprockets is equal to the space between the centers of lugs 11 on the conveyor chain 10 so that each rotation of the driven sprocket 24 produces a conveyor movement of one flight, although not at constant velocity.

As the cam shaft 52 turns counterclockwise from the position shown in FIG. 1, the cam surface recedes to the left at a gradually increasing velocity. The prototype cam is designed so that the leftward movement of the spring-biased reciprocating bar 44 accelerates until the movable idler sprocket 34 is moving at one-half the rate of the main drive chain 36 coming around the main drive sprocket 26. Thus, for a period of each cycle the movable idler sprocket supplies all of the chain input to the main driver sprocket 26, and to pull is applied to rotate the driven sprocket 24. The other movable idler sprocket 32 is taking up the slack in chain 30 at that same rate. During this period the conveyor stop and go driven sprocket 24 remains stationary and there is no movement of the conveyor 10. Then, toward the end of the first half cycle, the leftward movement of the reciprocating bar 44 slows, and the rotation of the stop and go output sprocket 24 starts again and eventually exceeds the rotary speed of the input and driver sprockets 12 and 26.

During the next half cycle, the cam 48 drives the reciprocating bar 44 back to the right toward the position shown in FIG. 1. This causes the stop and go driven sprocket 24 to rotate at an accelerated rate to complete one revolution at the same time the driver sprocket 26 completes its revolution, despite the previous stop time. The shape of the cam is such that the velocity of each lug 11 vs. time moves in a sine curve starting slowly and reaching maximum speed in the middle of each stroke, and then slowing down to a stop at the end of each stroke, during which time the stop and go output sprocket is rotating at basic drive sprocket speed. If it is desired to lengthen the conveyor stop time, the stroke of the reciprocating bar 44 may be increased, or the ratio of sprocket 50 to sprocket 56 may be changed. If it is desired to increase the length of each increment of movement of the conveyor chain 10, the conveyor drive sprocket 20 may be made of larger pitch diameter than the stop and go driven sprocket 24. However, the conveyor stop time would be the same.

OPERATION

As described above, the system input sprocket 12, the main driver sprocket 26 and the stop and go driven sprocket 24 may be of the same size, with their circumferences being equal to the space between the lugs 11 on the conveyor chain 10. Accordingly, during the brief periods when the reciprocating bar 44 is at rest at the end of its strokes, the drive sprockets 12, 26 and 24 would all be rotating at the same basic sprocket speed. Then, as the cam 48 turns counterclockwise and the cam follower 46 moves down from the high point of the cam, the cam follower 40 moves to the left, first slowly and then accelerates to one-half the speed at which the chain 30 is being pulled by the driver sprocket 26, the slack being supplied by the movable idler pulley 34. This movement of the reciprocating bar 44 causes the conveyor chain 10 to slow down and then stop and remain at rest during the rapid movement of the reciprocating bar. Towards the end of the first one-half of the cam revolution, the reciprocating bar 44 slows down and then stops for a brief period at rest as the cam follower 46 traverses the low arc of the cam 48. During this brief period the stop and go driven sprocket 24 is rotating at the same speed as the driver sprocket 26. Then, the cam follower 46 with idler sprocket 34 starts moving to the right pulling the chain 30 faster than is normally pulled by the driver sprocket 26, the speed of the driven sprocket 24, and hence that of the conveyor 10 are increased, causing it to make up for the stop time and complete its full, one flight movement during a revolution of the driver sprocket 26.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. A stop and go conveyor comprising:
    a driver sprocket;
    rotary input means rotating said driver sprocket at a constant speed;
    a driven sprocket;
    a chain positively engaged over said driver and driven sprockets with slack therebetween;
    a pair of movable idler sprockets positively engaging said chain between said driver and driven sprockets to take up said slack;
    a reciprocable carrier rotatably supporting said movable idler sprockets; and
    means for reciprocating said carrier through a complete cycle during each revolution of said driver sprocket so that, in one direction, more chain is received at the reciprocating idler sprocket from said driven sprocket than is taken from said driver sprocket and, in the other direction, more chain is taken from said driver sprocket at the reciprocating idler sprocket than is received from said driven sprocket.

2. The stop and go conveyor defined by claim 1 wherein:
    during a portion of movement of said carrier in said one direction said idler sprockets are moving fast enough to supply chain to said driver sprocket without pulling any chain from said driven sprocket.

3. The stop and go conveyor defined by claim 1 including:
    a rotary cam;
    cam driving means rotating said cam at the same constant speed as said driver sprocket; and
    a cam follower on said idler sprocket carrier biased against said cam.

4. The stop and go conveyor defined by claim 3 wherein said cam driving means comprises:
    a cam drive sprocket mounted to rotate with said dirver sprocket;
    a cam shaft carrying said cam;
    a cam sprocket of the same size as said cam driver sprocket carried on said cam shaft.

5. The stop and go conveyor by claim 1 including:
    a first pair of stationary idler sprockets engaging the tension side of said chain where pulled by said driver sprocket; and
    a second pair of stationary sprockets engaging the slack side of said chain where taken from said driver sprocket;
    said movable sprocket engaging the tension at slack sides of said chain intermediate each of said pairs of stationary sprockets.

* * * * *